United States Patent [19]

Rizza et al.

[11] Patent Number: 4,862,198

[45] Date of Patent: Aug. 29, 1989

[54] ELECTROSTATIC CLEANING OF ELECTRODES IN AN ELECTROGRAPHIC PRINTER

[75] Inventors: Robert S. Rizza, Manchester; Ben W. Fagen, Jr., Enfield; Michael W. Raymond, Bolton; Peter Feher, West Hartford, all of Conn.; Norman L. Milliard, Hampton, N.H.; Thomas B. Kegelman, Palm Harbor, Fla.

[73] Assignee: Moore Business Forms, Inc., Grand Island, N.Y.

[21] Appl. No.: 254,075

[22] Filed: Oct. 6, 1988

[51] Int. Cl.[4] .............................................. G01D 15/00

[52] U.S. Cl. ................................ 346/153.1; 346/154; 346/159

[58] Field of Search ..................... 346/153.1, 150, 154, 346/159; 364/518, 519

[56] References Cited

U.S. PATENT DOCUMENTS

| | | | |
|---|---|---|---|
| 4,592,644 | 6/1986 | Koizumi | 346/153.1 |
| 4,638,339 | 1/1987 | Coburn et al. | 346/153.1 |
| 4,702,588 | 10/1987 | Hatabe et al. | 346/153.1 |
| 4,752,805 | 6/1988 | Fukae et al. | 346/153.1 |
| 4,754,300 | 6/1988 | Fukae | 346/153.1 |

OTHER PUBLICATIONS

IBM Tech. Disclosure Bulletin, vol. 24, No. 2, Jul. 1981.

*Primary Examiner*—Arthur G. Evans

*Attorney, Agent, or Firm*—Nixon & Vanderhye

[57] ABSTRACT

The print head of an electrographic printer is cleaned electrostatically. The printhead has a number of electrodes in an electrode array, which cooperate with a dielectric belt. Periodically, printing with the printer is interrupted (e.g. after every 100 pages of printing, or about every minute), and then substantially all of the electrodes are energized at the same time for a time period sufficient to effect burning off of contaminants from the electrodes (e.g. about the time it takes to print four pages, or about 3 seconds). A host computer controls the operation of the printer components. The printer developer unit may be moved away from the dielectric belt prior to the energization of all of the electrodes to effect cleaning.

15 Claims, 1 Drawing Sheet

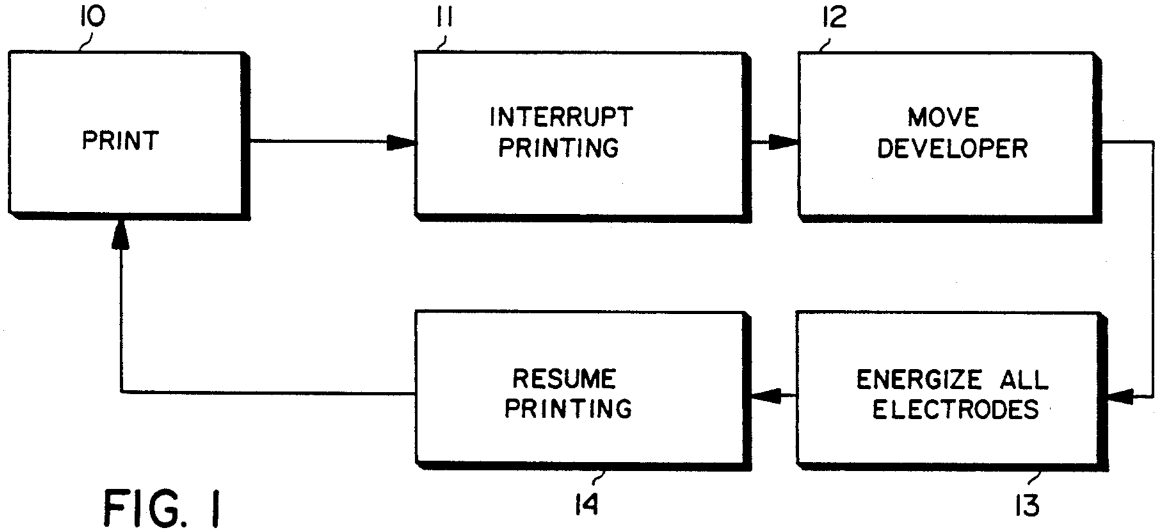
FIG. 1
FIG. 2
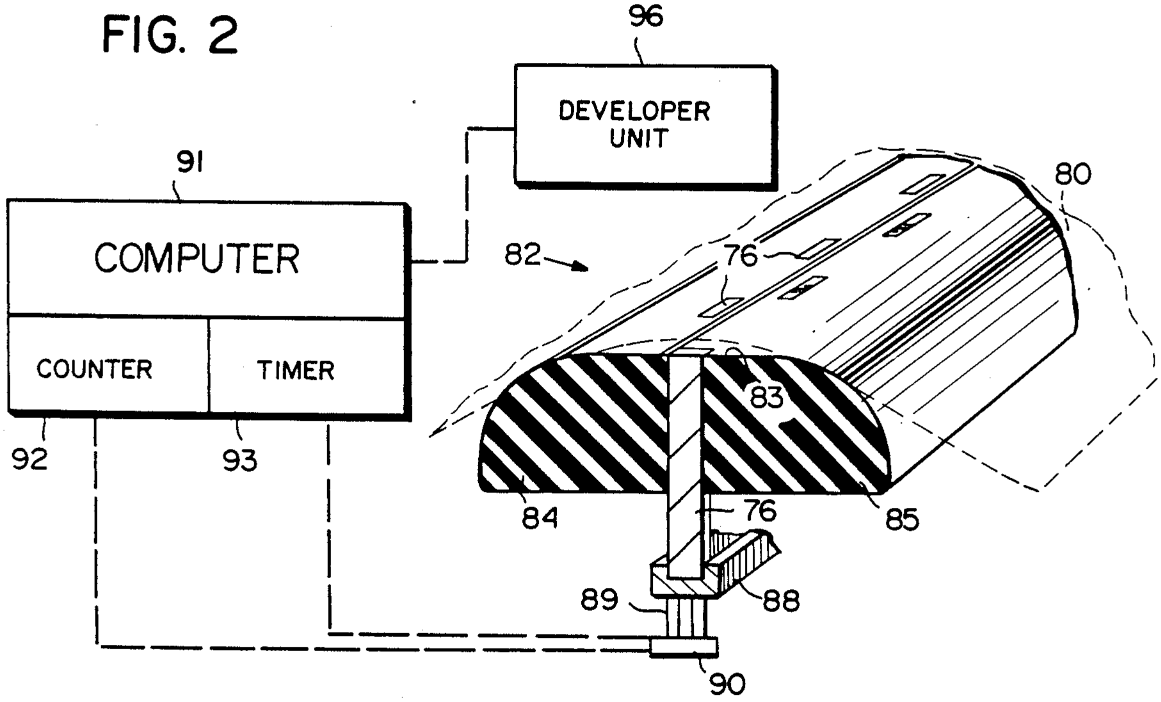

ELECTROSTATIC CLEANING OF ELECTRODES IN AN ELECTROGRAPHIC PRINTER

BACKGROUND AND SUMMARY OF THE INVENTION

In electrographic printers, discretely controlled ionization is employed to form the charged image on a dielectric surface. The dielectric surface then passes through a developer unit for developing a latent image thereon, and the developed electrostatic latent image is then transferred to a sheet of copy material (typically paper). Uniform and consistent ion formation and transport in the electric field is essential to guarantee the quality of the imaging, however contamination often readily occurs.

Ionization is typically accomplished by selectively energizing electrodes in an electrode array. During printing, only a very small proportion of the electrodes will be energized at any one time. Contamination of the exposed electrodes occurs by the deposition of polymers and aerosols that are present in the surrounding environment, and by the deposition of compounds generated in the ion imaging process itself which result from the ionization of gas in the presence of other contaminants. Subtle degradation of the electrodes can also occur due to the migration of non-precious metals through precious metals protective electrode coatings.

As a result of the build-up of contaminants on the electrodes, the quality of the print can decrease remarkably, and in fact the contaminants may ultimately provide a total insulative blockage of the electrode surface due to a microscopically thin layer that is not readily detectable by visual examination. This latter effect is particularly insidious since the "Townsend Multiplication" phenomena results in regeneration of charge carriers that become unstable resulting in infrequent, but noticeable, imaging defects.

Because of the reduction in print quality that occurs from electrode contamination, methods of cleaning the electrodes have been suggested, such as in U.S. Pat. No. 4,638,339 (the disclosure of which is hereby incorporated by reference herein). Such cleaning systems typically comprise wiping or otherwise physically acting upon the electrode and/or dielectric belt surfaces to remove contaminants during a non-print portion of the cycle of operation. Such procedures are much less effective than desirable, however, and either do not produce the desired results or introduce problems of their own.

According to the present invention, a method of electrostatic cleaning of the ion electrodes of an electrographic printer is provided which is very effective, and which is very easy to implement and control, and results in a minimum disturbance of the printing cycle. Basically, according to the invention electrographic printing is periodically temporarily interrupted, and then substantially all of the electrodes in the electrode array are energized for a period of time sufficient to effect cleaning of the electrodes. While the invention is applicable to a wide variety of electrographic printing structures and procedures, it is particularly useful with respect to electrographic printing elements as disclosed in said U.S. Pat. No. 4,638,339 since the relative positioning, and the construction, of the components there (with sufficient gap to support Townsend Multiplication) provides a very effective "burn off" of the contaminants.

While the cycles of interruption and energization can vary widely depending upon the particular circumstances, typically printing would be interrupted after the printing of every 100 pages, and substantially all of the electrodes would be energized for a time period equal to the approximate time it takes to print about four pages. By the practice of such a technique, not only can a clean print head be kept clean, the print quality of a contaminated print head can be brought back to acceptability over a period of time. For example, a moderately contaminated print head can be brought back to acceptability after about 300 pages of print, whereas a badly contaminated head would reach acceptability after about 2,000 pages of printing.

It is possible to practice the invention with only a minimum of equipment and minimum modifications of existing equipment and techniques. For example, when employed with an electrographic printer such as shown in said U.S. Pat. No. 4,638,339 with a host computer controlling the printer functions, including the selective energization of the electrodes all that is necessary is a simple, straight-forward change in the software which any programmer can readily implement. The software changes would typically provide for periodic temporary interruption of the printing (preferably after the count of the number of printed pages), movement of the developer away from the dielectric belt, energization of substantially all of the electrodes (pins), and then after energization of substantially all of the electrodes for a predetermined period of time, restarting the electrographic printing procedure.

It is the primary object of the present invention to provide for the effective yet simple cleaning of an electrographic print head. This and other objects of the invention will become clear from an inspection of the detailed description of the drawings and from the appended claims.

BRIEF DESCRIPTION OF THE DRAWINGS

FIG. 1 is a diagrammatic view illustrating the practice of the method steps according to the invention; and FIG. 2 is a schematic view illustrating an exemplary form of apparatus utilized according to the invention.

DETAILED DESCRIPTION OF THE DRAWINGS

The basic steps of the method according to the invention for effecting electrostatic cleaning of an electrographic printer is illustrated diagrammatically in FIG. 1. Typical electrographic printing is illustrated by box 10. The electrographic printing is periodically temporarily interrupted, as indicated by box 11. The period involved may be a predetermined printing time period, and/or a predetermined number of pages that have been printed since the last cleaning cycle. For example, the temporary printing interrupting step 11 may be practiced after every 100 pages printed, or after each minute of actual printer operation.

Once printing has been interrupted in step 11 preferably the next step is the movement of the developer unit, in step 12, away from the dielectric belt of the electrographic printer. This step may or may not be necessary depending upon the particular design of the printer. The next step 13 is to energize all of the electrodes of the electrode array of the print head for a predetermined period of time, sufficient to effect cleaning of the electrodes while the electrographic printing has been temporarily interrupted. Typically, this would be the amount of time that it took to print four pages, or in the neighborhood of about three seconds. Then energization of all of the electrodes 13 is terminated, and printing resumed in step 14.

FIG. 2 schematically illustrates exemplary apparatus according to the invention, and for practicing the method according to the invention. The print head 82 is illustrated in its preferred form, from FIGS. 6 and 7 of said U.S. Pat. No. 4,638,339, the reference numerals in FIG. 2 corresponding to the related reference numerals in FIGS. 6 and 7 of said patent.

As can be seen in FIG. 2, the print head 82 includes an array of electrodes, the individual electrodes being indicated by reference numerals 76. The electrodes 76 are mounted by contoured belt-supporting elements 84, 85 which are configured to provide a desired spacing between the dielectric belt 80 (shown in phantom line in FIG. 2) and the electrodes 76. Typically the spacing would be between about 0.15 mils–0.4 mils (for a dielectric thickness of 0.25 mils and a dielectric constant of 3.0). The bending modulus of the dielectric belt 80 is sufficiently high to preclude contact with the electrodes 76 (conductive members) when the dielectric member 80 is in tension, and the configuration of the elements 84, 85 provides two closely spaced support areas defined by smooth parti-cylindrical surfaces which engage the dielectric belt 80, with a flattened area 83 therebetween.

A suitable connector 88 establishes electro-connection between the electrodes 76, through cables 89, and a drive circuit 90. The drive circuit 90 comprises means (in association with the control therefor) for selectively energizing the electrodes 76 to effect printing.

Control for the drive circuit 90 may be provided by a host computer 91, which includes a built-in counter 92 and timer 93, although mechanical and/or circuitry elements could be used in place of a computer. The computer 91 also controls a developer unit 96 which applies toner to the dielectric belt 80 during printing, in the practice of the electrographic printing process, and controls the position of the developer unit 96. The structure according to the invention may thus be essentially the same as for conventional electrographic printers, the only difference being in the software used to control the computer 91, and structure for moving unit 96.

The computer 91, with associated software, comprises means for periodically temporarily interrupting the electrographic printing (after printing of a complete page and before another page is started), including cessation of application of toner to belt 80, and means for periodically activating the circuitry 90 for energizing substantially all of the electrodes 76 in the electrode array at the same time, for a period of time sufficient to effect cleaning of the contaminates from the electrodes while the electrographic printing has been temporarily interrupted. The computer 91 also may control a mechanism mounting the developer unit for moving the developer unit 96 away from the dielectric belt 80 depending upon the particular printer design. Again, the computer 91 would typically control energization of substantially all of the electrodes so that after each about 100 pages of printing was counted, the electrodes would be energized for a period of time equal to the approximate time it takes to print about four pages (e.g. after about one minute of actual printing all of the electrodes 76 would be energized for about three seconds).

With the particular design of the print head 82 illustrated in FIG. 2, the burn off of contaminants is extremely effective when the invention is practiced, and in fact the invention can not only maintain print head cleanliness when one starts with a clean print head, but it is also possible to improve the quality of contaminated print heads to an acceptable level. Of course a slightly different control of the electrodes may be provided when improving print head quality, as opposed to maintaining the cleanliness of an already clean print head, and also depending upon the particular printer design the printer interruption and electrode energization cycles may be different. For example depending upon the particular printer design it may be desirable to energize all the electrodes for some time, only half of them for another time, and the other half for a further period of time. All such modifications are within the scope of the invention in which the electric means are periodically activated for energizing substantially all of the electrodes to effect cleaning.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of cleaning a print head of an electrographic printer having an electrode array and electric means for selectively energizing the electrodes in the electrode array during normal printing, comprising the steps of sequentially:

(a) periodically temporarily interrupting electrographic printing with the print head;

(b) while printing is temporarily interrupted, activating substantially all of the electrodes of the electrode array with the same electric means that energizes selective electrodes during normal printing to effect cleaning of the electrodes; and (c) resuming electrographic printing.

2. A method as recited in claim 1 wherein the printer has a developer and a dielectric belt cooperating with the electrode array, which changes the charge applied to the belt, and wherein step (a) is practiced by stopping application of toner to the dielectric belt by moving the developer away from the dielectric surface, without moving the dielectric belt.

3. A method as recited in claim 2 wherein step (a) is practiced approximately every 100 pages printed, and wherein step (b) is practiced to energize substantially all of the electrodes for a time period equal to the approximate time it takes to print about 4 pages.

4. A method as recited in claim 1 wherein step (b) is practiced for about 3 seconds for approximately every minute of printing.

5. A method as recited in claim 1 wherein step (a) is practiced approximately every 100 pages printed, and wherein step (b) is practiced to energize substantially all of the electrodes for a time period equal to the approximate time it takes to print about 4 pages.

6. A method as recited in claim 2 wherein step (b) is practiced for about 3 seconds for approximately every minute of printing.

7. An electrographic printer comprising an electrode array extending across a dielectric member, and electric means for selectively energizing the electrodes in the electrode array to effect change in the charge level of the dielectric member during normal printing, to effect electrographic printing, comprising:

(a) means for periodically temporarily interrupting electrographic printing; and (b) means for periodically activating said electric means for energizing substantially all of the electrodes in the electrode array for a period of time sufficient to effect cleaning of said electrodes while electrographic printing has been temporarily interrupted.

8. A printer as recited in claim 7 wherein said means (a) and (b) comprise a controlling computer.

9. A printer as recited in claim 7 wherein said dielectric member comprises a flexible dielectric member having an electrically conductive ground plane backing element and reinforcing layer, and further comprising:

support means for the dielectric member including two closely spaced support areas defined by parti-cylindrical surfaces engaging the dielectric member and defining an unsupported region of the dielectric member therebetween;

the bending modulus of said dielectric and reinforcing members being sufficient to preclude contact with the electrode array between said support areas when said dielectric member is in tension, whereby the desired spacing between the electrode array and the dielectric member to effect electrostatic charge deposition occurs in the unsupported region of the dielectric member.

10. Apparatus for establishing the spacing between a conductive member and a moving dielectric member under tension in an electrographic printer comprising:

a flexible dielectric member having an electrically conductive ground backing element;

support means for the dielectric member including two closely spaced support areas defined by smooth parti-cylindrical surfaces engaging the dielectric member with a flattened area therebetween smoothly merging with the parti-cylindrical surfaces;

an electrode array extending across the dielectric member, and electric means for selectively energizing the electrodes in the electrode array to effect change in the charge level of the dielectric member during normal printing, and means supporting said electrode array in the flattened area of the support means;

the bending modulus of said dielectric member being sufficiently high to preclude contact with the conductive member between said support areas when said dielectric member is in tension; whereby the desired spacing between the electrode array and the dielectric member to effect electrostatic charge deposition occurs in the unsupported region of the dielectric member; and cleaning means for selectively cleaning the dielectric member support surfaces and the electrode array, said cleaning means comprising means for temporarily interrupting application of toner to said dielectric member, and means for energizing substantially all of the electrodes in the electrode array with said electric means, during interruption of toner supply to said dielectric member.

11. Apparatus for establishing the spacing between an electrode array and a flexible moving dielectric member in an electrographic printer comprising:

a print head having a length substantially equal to or greater than the width of the flexible movable dielectric member and including an electrode array extending along the length of the print head, each electrode in the array terminating in an end facing outwardly therefrom;

a tensioned flexible dielectric member supported for movement relative to said print head and for engagement therewith, aid dielectric member having a conductive ground plane layer on the said opposite to said print head;

electrical means for selectively energizing the electrodes in the array to effect change in the charge level of the dielectric member during normal printing;

said print head having generally smooth arcuate face portions disposed on opposite sides of the electrode array for supporting engagement with the dielectric member as it moves across the face of said print head;

the portion of said print head between said arcuate face portions being generally flat, said dielectric member having a modulus of bending sufficiently large to provide a portion thereof spaced from said print head;

the ends of the electrode array being disposed in said generally flat portion of the print head and spaced from the dielectric; and comprising means for temporarily interrupting application of toner to said dielectric member, and means for energizing substantially all of the electrodes in the electrode array with said electric means, during interruptions of toner to said dielectric member.

12. A method as recited in claim 1 wherein steps (a) and (b) are practiced without moving the print head.

13. A method as recited in claim 6 wherein steps (a) and (b) are practiced without moving the print head.

14. A printer as recited in claim 8 wherein means (a) and (b) consist of said controlling computer and electrical connections between said controlling computer and said electric means.

15. A printer as recited in claim 14 wherein said dielectric member comprises a flexible dielectric member having an electrically conductive ground plane backing element and reinforcing layer, and further comprising:

support means for the dielectric member including two closely spaced support areas defined by parti-cylindrical surfaces engaging the dielectric member and defining an unsupported region of the dielectric member therebetween;

the bending modulus of said dielectric and reinforcing members being sufficient to preclude contact with the electrode array between said support areas when said dielectric member is in tension, whereby the desired spacing between the electrode array and the dielectric member to effect electrostatic charge deposition occurs in the unsupported region of the dielectric member.

* * * * *